Oct. 2, 1945.  J. C. WAHL  2,386,152
APPARATUS FOR OPENING AND EMPTYING CAPPED BOTTLES
Filed Sept. 24, 1941  6 Sheets-Sheet 1
Fig. 1.
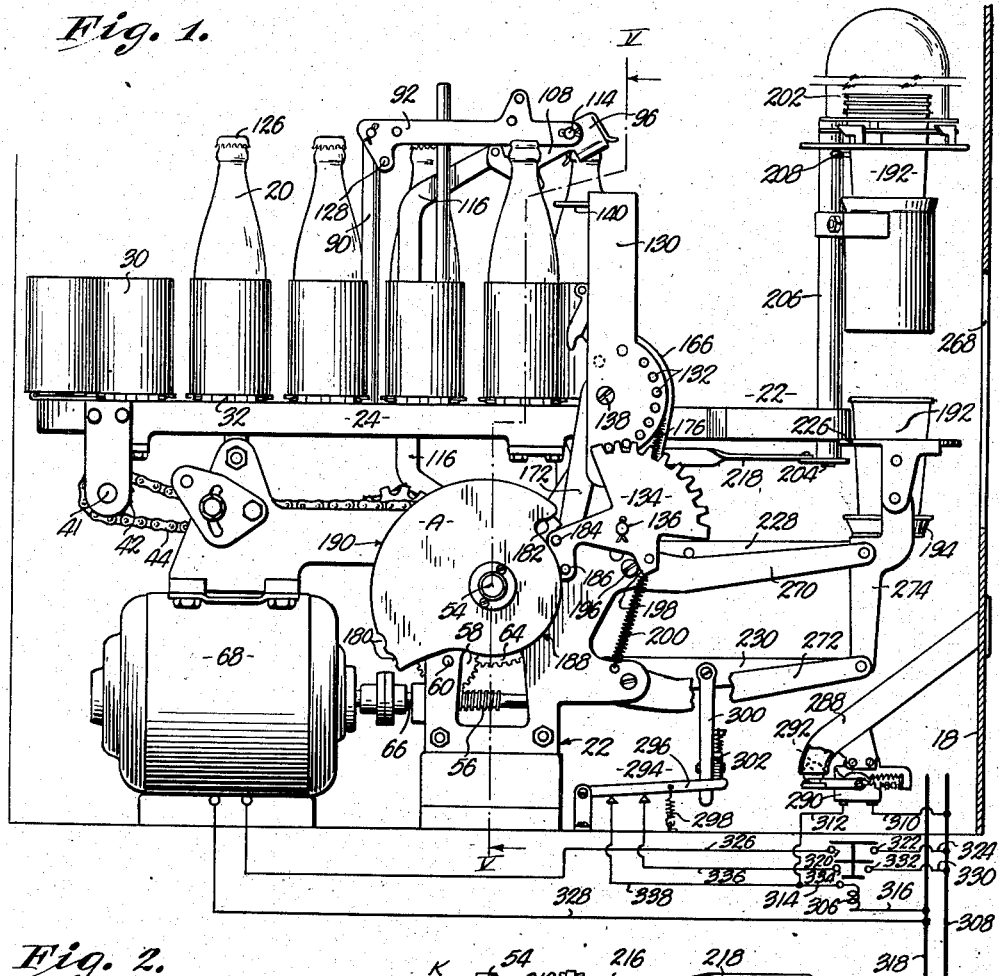
Fig. 2.
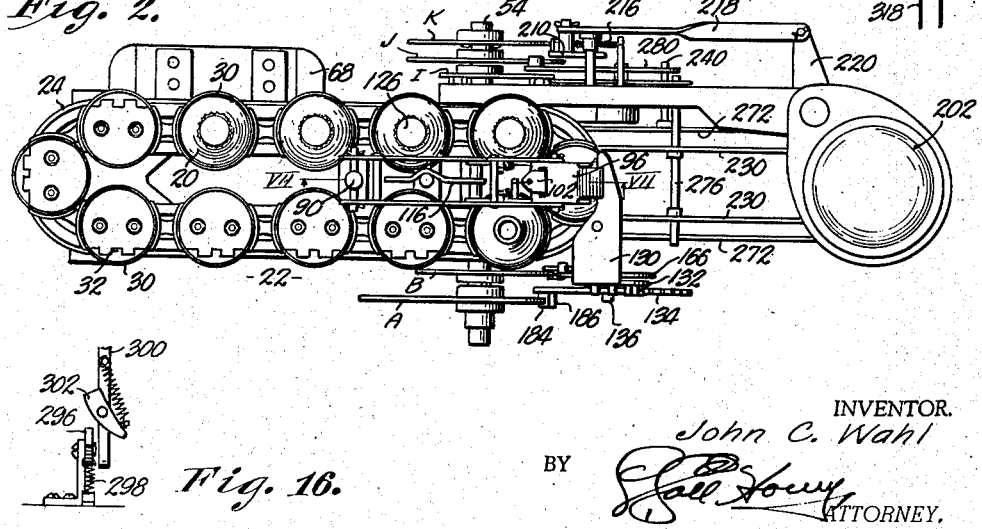
Fig. 16.
INVENTOR.
John C. Wahl
BY
ATTORNEY.

Oct. 2, 1945.   J. C. WAHL   2,386,152
APPARATUS FOR OPENING AND EMPTYING CAPPED BOTTLES
Filed Sept. 24, 1941   6 Sheets-Sheet 2

INVENTOR.
John C. Wall
BY
ATTORNEY.

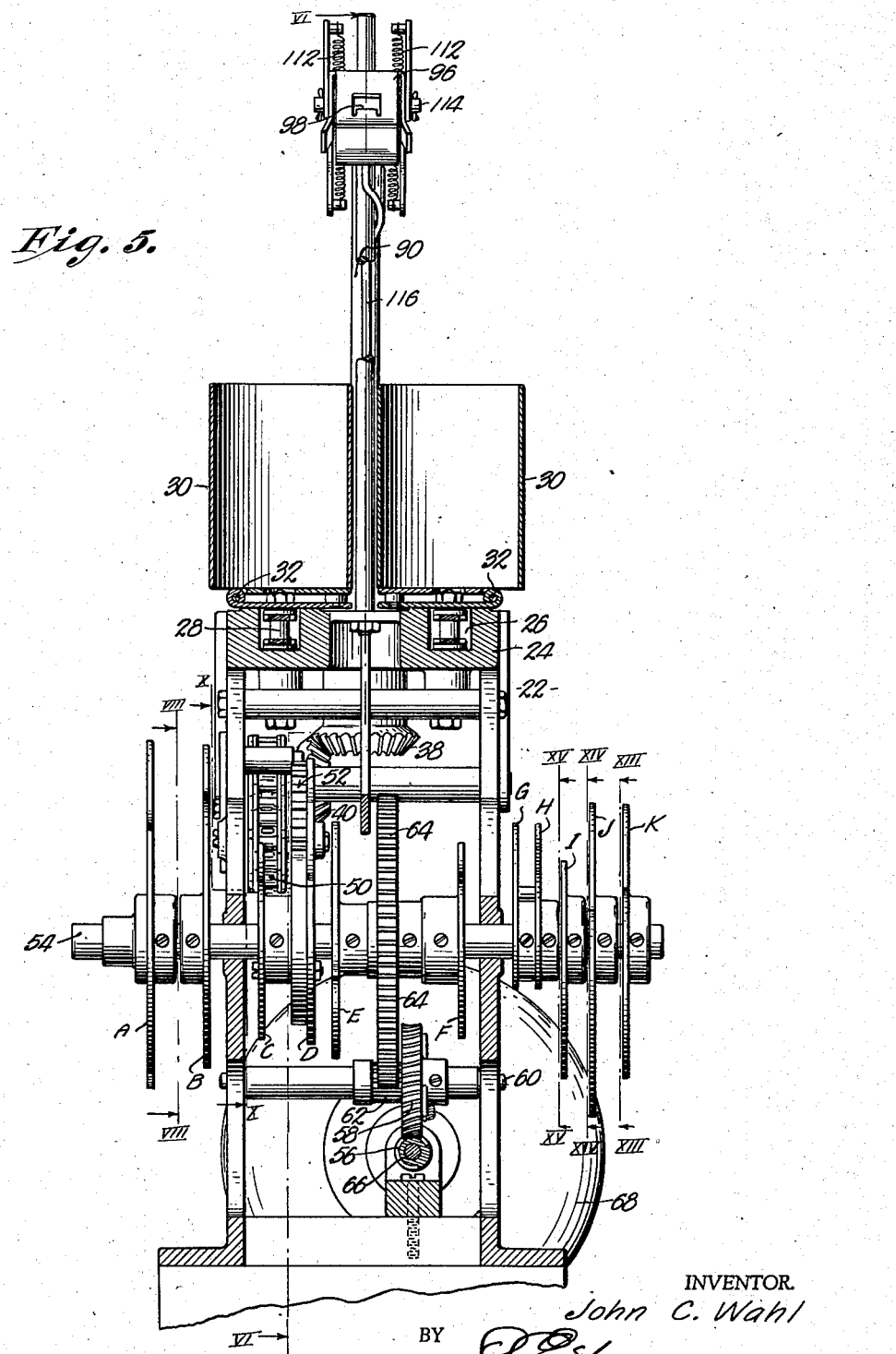

Oct. 2, 1945.  J. C. WAHL  2,386,152
APPARATUS FOR OPENING AND EMPTYING CAPPED BOTTLES
Filed Sept. 24, 1941  6 Sheets-Sheet 4
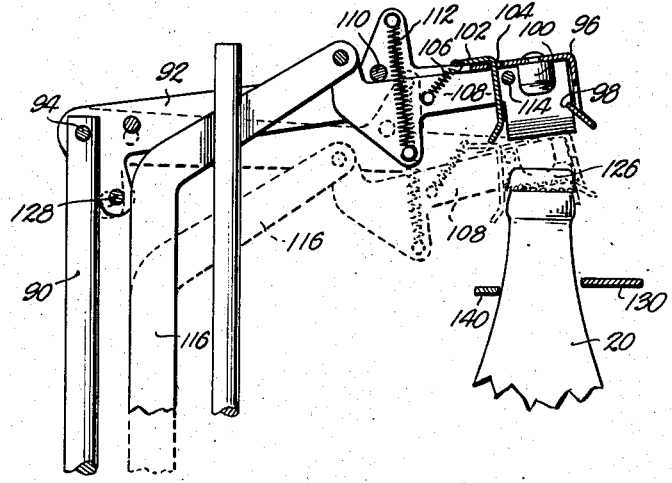
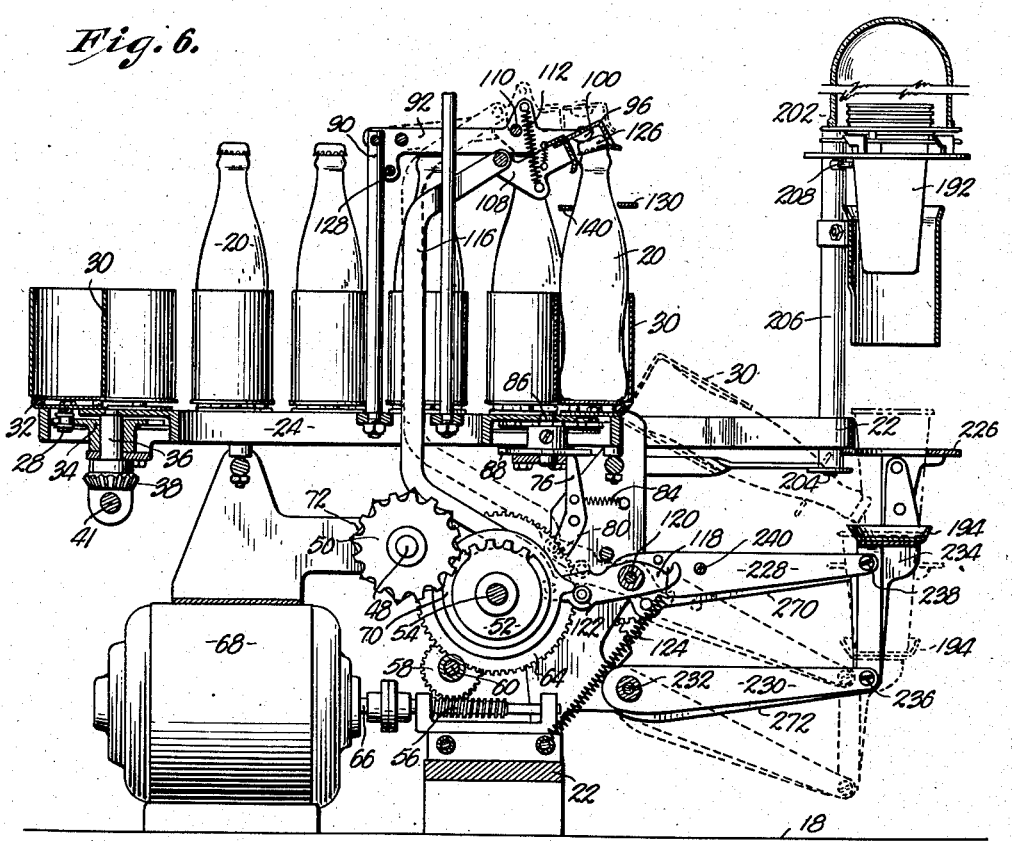
INVENTOR.
John C. Wahl
BY 
ATTORNEY.

Oct. 2, 1945.   J. C. WAHL   2,386,152
APPARATUS FOR OPENING AND EMPTYING CAPPED BOTTLES
Filed Sept. 24, 1941   6 Sheets-Sheet 5
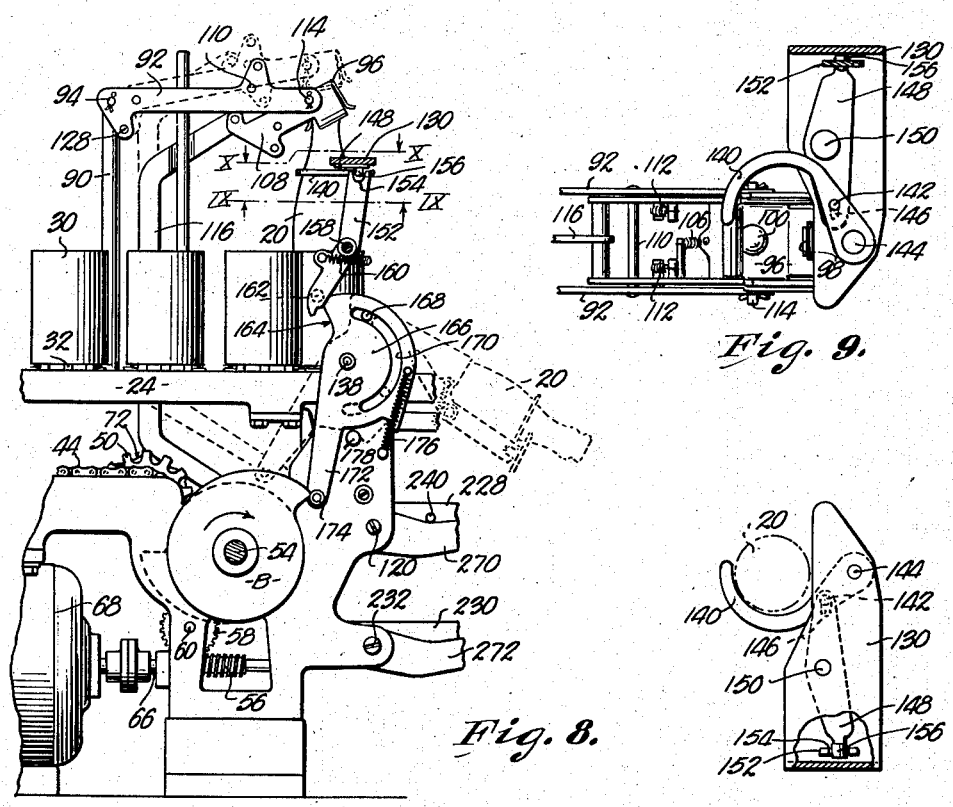
Fig. 8.
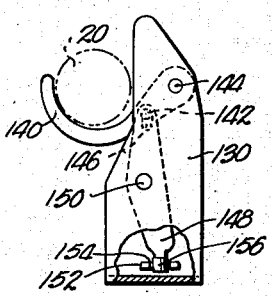
Fig. 9.
Fig. 10.
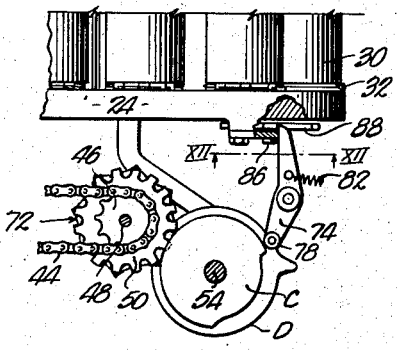
Fig. 11.
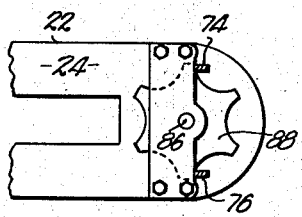
Fig. 12.
INVENTOR.
John C. Wahl
BY
ATTORNEY.

Oct. 2, 1945.   J. C. WAHL   2,386,152
APPARATUS FOR OPENING AND EMPTYING CAPPED BOTTLES
Filed Sept. 24, 1941.   6 Sheets-Sheet 6

INVENTOR.
John C. Wahl
BY
ATTORNEY.

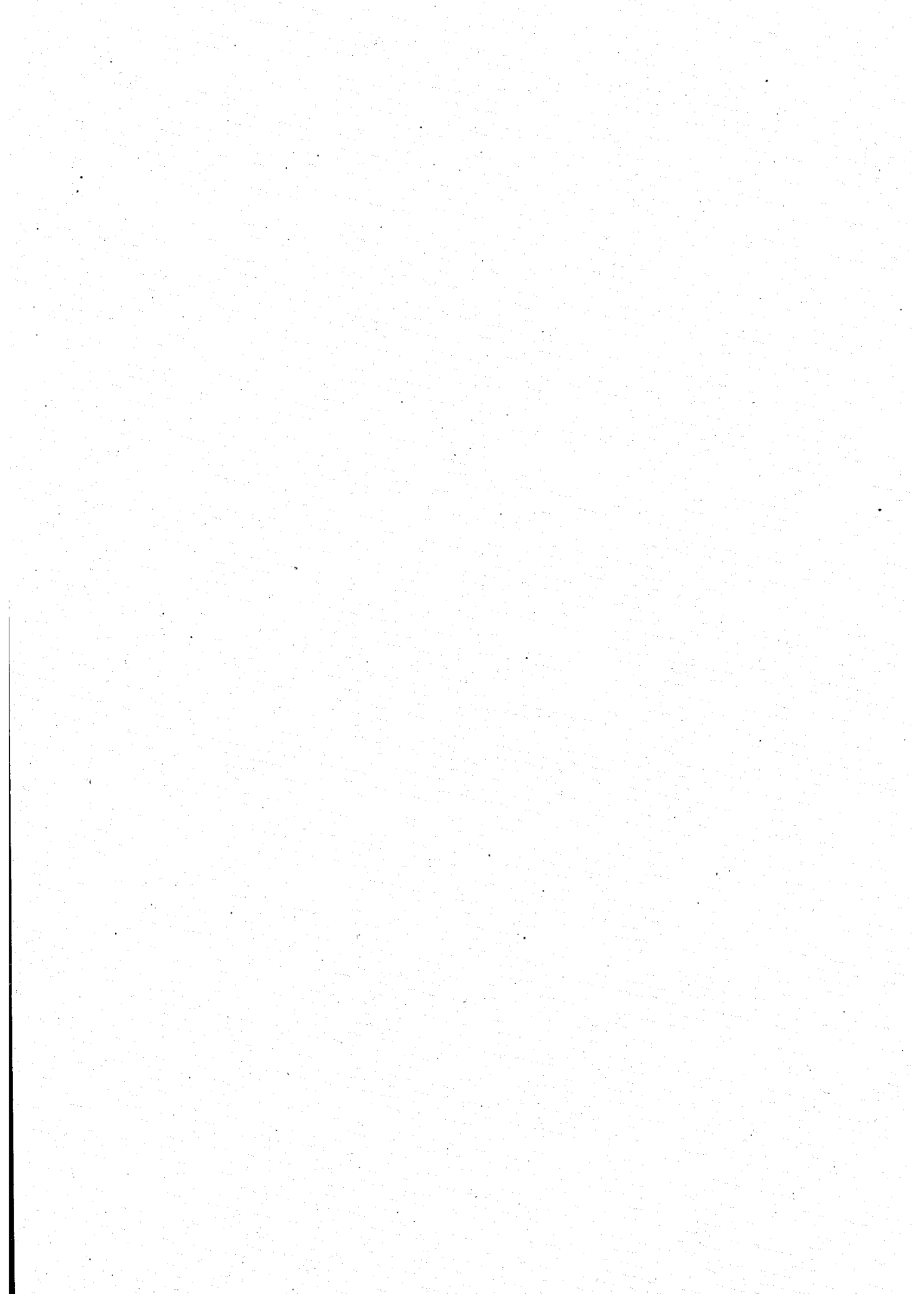

Patented Oct. 2, 1945

2,386,152

UNITED STATES PATENT OFFICE 2,386,152

APPARATUS FOR OPENING AND EMPTYING CAPPED BOTTLES

John C. Wahl, Chicago, Ill., assignor to C. Earl Hovey, Kansas City, Mo., as trustee Application September 24, 1941, Serial No. 412,159

14 Claims. (Cl. 225—21)

This invention relates to vending equipment for the contents of capped bottles, and has for its primary object the provision of apparatus for opening and emptying capped bottles in succession, automatically and through the employment of a single source of power, operable, if desired, by the deposit of a coin, token or the like, into the machine where mechanism embodying the invention is present.

One of the important aims of this invention is the provision of apparatus for handling bottled goods that is capable of positioning a capped bottle, automatically removing the cap from the bottle as the same remains in a vertical, upright position, and thereafter automatically tipping the bottle in order that the contents thereof might be emptied into a container available to the purchaser.

A yet further aim of this invention is the provision of apparatus of the aforementioned character, having as a part thereof, means for successively presenting each of a number of vertically disposed bottles below a decapper, causing the decapper to remove the bottle cap after the same has been centered therebeneath, tipping the bottle to pour the contents therefrom into a suitable receptacle, and lowering said receptacle with the mouth of the tipped bottle, to maintain constant the distance between bottle and receptacle during the time the bottle is moving through its downward path of travel.

Another important aim of this invention is to provide a vending machine having means for carrying a plurality of vertically disposed bottles, each in a swingably mounted carrier, means for decapping the bottles in succession, parts for gripping the bottle at the neck thereof and to tip the same to a downwardly inclined position where the contents thereof is emptied, and thereafter returning the empty bottle to the upright position, for the purpose of maintaining the bottle in its holder through the tipping cycle.

This invention has for a yet further aim to provide mechanism controllable by a single source of power for successively presenting vertical bottles to a decapper, thereafter gripping the bottle at the neck thereof, removing the cap, disposing a container, simultaneously tipping the bottle and lowering the container, presenting a guard about the container to prevent overturning thereof, quickly returning the emptied bottle to its upright position, and thereafter raising the filler container to a point where the same is available to the operator of the vending machine.

Other objects of the invention include the mechanical parts wherein is embodied concepts thereof, which parts are durably constructed, mounted in a compact manner for actuation by a single source of power, arranged whereby they will not accidentally become maladjusted, and designed to be housed in a suitable cabinet capable of being used commercially as a vending machine for soft drinks or the like.

A large number of details of construction embody minor objects of the invention and such will appear during the course of the following specification, referring to the accompanying drawings, wherein:

Fig. 1 is a side elevational view of the apparatus for opening and emptying capped bottles, made in accordance with the present invention and diagrammatically shown to be associated with parts completing an assembly capable of use as a vending machine.

Fig. 2 is a top plan view of the apparatus shown in Fig. 1, entirely disassociated from a cabinet or other parts of a vending machine.

Fig. 5 is a vertical sectional view taken on line V—V of Fig. 1.

Fig. 6 is a vertical longitudinal sectional view taken on line VI—VI of Fig. 5.

Fig. 7 is an enlarged detailed sectional view through the decapper taken on line VII—VII of Fig. 2.

Fig. 8 is a vertical fragmentary sectional view taken on line VIII—VIII of Fig. 5.

Fig. 9 is a fragmentary sectional view taken on line IX—IX of Fig. 8, looking in the direction of the arrows.

Fig. 10 is a similar sectional view taken on line X—X of Fig. 8, looking in the direction of the arrows.

Fig. 11 is a fragmentary detailed sectional view illustrating the mechanism for arresting movement of the endless conveyor for the holders.

Fig. 12 is a fragmentary sectional view taken on line XII—XII of Fig. 11, looking in the direction of the arrows.

Fig. 16 is a fragmentary detailed view illustrating the mechanical means for operating the cut-off switch.

Figure 3:
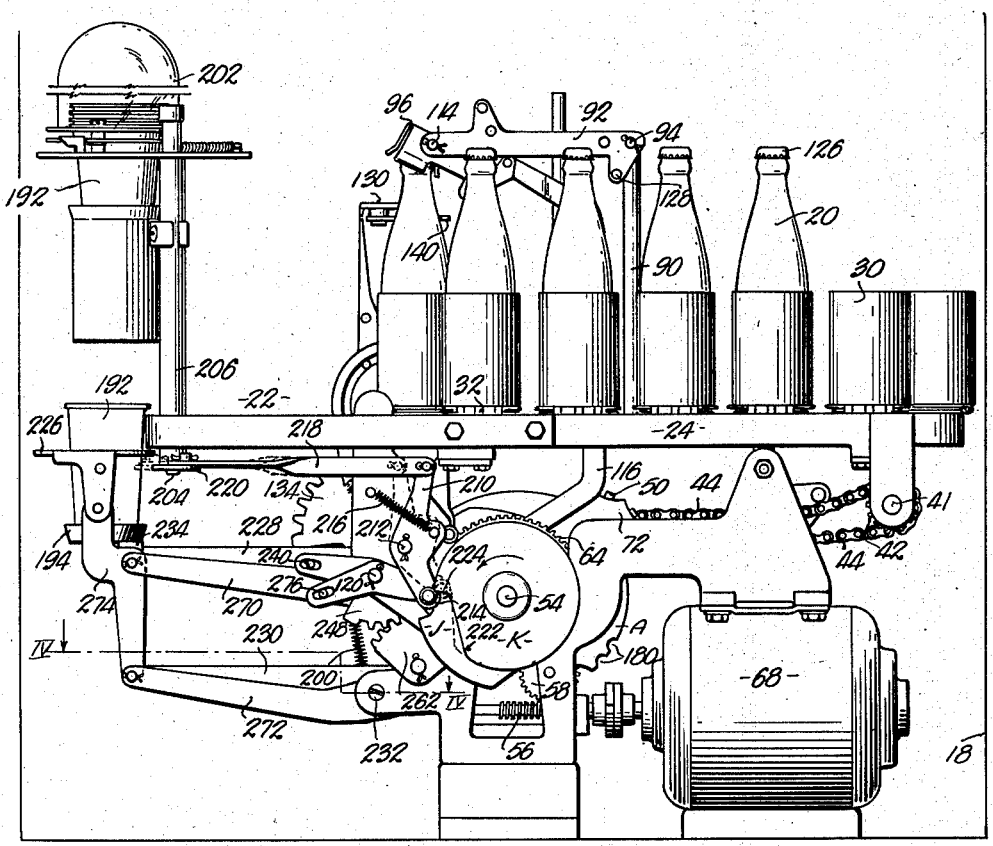
Fig. 3 is a side elevational view opposite to that shown in Fig. 1.

The unitary manner in which the apparatus shown in the accompanying drawings, is assembled, affords a structure that may be installed in a suitable cabinet 18, but a fragment of which is illustrated in Fig. 1, and which may be of conventional and well-known character. If the apparatus is to be employed in a vending machine operable by a patron upon the insertion of a coin or the like, then cabinet 18 must have walls of insulating material and contain any known means of refrigeration for maintaining capped bottles 20 at a desired temperature.

A rigid frame generally designated by the numeral 22, has a horizontally disposed table portion 24 grooved as at 26 to provide a way for an endless conveyor chain 28, upon which is mounted a number of holders 30 through the medium of hinges 32.

This endless conveyor chain 28 is driven by a sprocket 34 on spindle 36 journalled in table 24 and having bevel gear 38 thereon in mesh with bevel gear 40, likewise carried by a portion of frame 22, whereon is supported stub shaft 41 having sprocket 42 pinned or otherwise secured thereto.

This sprocket is engaged by drive chain 44 that passes over sprocket 46 on shaft 48 journalled for rotation in frame 22. This shaft 48 has a gear 50 rigid thereto in mesh with a mutilated gear 52 on driven shaft 54. Driven shaft 54 is rotated about its axis through the medium of a train of gears comprising worm 56, worm pinion 58 on shaft 60 and pinion 62 in mesh with gear 64. Worm 56 is on drive shaft 66 of motor 68 and the said train of gears are mounted as illustrated in Fig. 6. Immediately adjacent to mutilated gear 52 on shaft 54 is disc 70, a portion of which is cut away, while the remaining annular periphery thereof is contoured to engage Geneva gear 72 mounted on shaft 48.

Through the mechanism just described, conveyor chain 28 is advanced in step-by-step movement to successively present bottles 20 to a position beneath the decapper, shown in detail in Fig. 7.

Driven shaft 54 has a series of eleven cams rigidly mounted thereon, as shown in Fig. 5. These cams designated from left to right in said figure are A, B, C, D, E, F, G, H, I, J and K respectively.

Cams C and F are related to dogs 74 and 76 respectively, each pivotally mounted intermediate their ends to frame 22 and held in position with rollers 78 and 80 respectively on their lowermost ends in engagement with cams C and F respectively, by springs 82 and 84 respectively.

Idler stub shaft 86, around which chain 28 passes, carries star wheel 88 against diametrically opposite portions of which dogs 74 and 76 are urged by their respective cams C and F when a bottle is beneath the decapper and immediately after mutilated gear 52 has passed out of mesh with gear 50. Cams C and F are contoured to insure that dogs 74 and 76 will be withdrawn from the position shown in Figs. 11 and 12 immediately prior to meshing of gears 50 and 52.

Cam E controls the decapper, which comprises a supporting post 90 extending vertically from table 24 of frame 22 at the upper end of which is pivotally mounted a yoke 92 as at 94. The free end of yoke 92 carries a hood 96 having internal shoulder 98, a boss 100 and an apron 102 opposite to shoulder 98 that is fulcrumed as at 104 and yieldably held in normal position by a spring 106.

Hood 96 has a pair of substantially T-shaped arms disposed parallel to the legs of yoke 92 and projecting toward pivotal point 94 of said yoke. These T-shaped arms 108 are normally held against tie-rod 110 of yoke 92 by springs 112. Hood 96 is pivotally mounted to yoke 92 by pintle 114 carried by the free ends of yoke 92. Link 116 pivotally secured to one extremity of arms 108 to one side of springs 112, joins hood 96 to one end of rocker arm 118, pivotally mounted on transverse shaft 120 intermediate its ends, provided with a roller 122 on one side for engagement with cam E and yieldably held in the position shown in dotted lines of Fig. 6 by a spring 124.

Cam E has an abrupt projection thereon (Fig. 6), which strikes roller 122 to draw both yoke and hood 92 and 96 down to the position shown in dotted lines of Fig. 7 where shoulder 98 has engaged beneath cap 126 of bottle 20. After cam E moves yoke and hood downwardly over the cap of the bottle, hood 96 is moved about the axis of pintle 114 to tip hood 96 and gently pry cap 126 from its position while yoke 92 is rigidly held against post 90. A tie-pin 128 transversely disposed between the legs of yoke 92 bears against post 90 to afford the rigidity needed. Immediately after cap 126 is pried upwardly by shoulder 98, roller 122 of rocker arm 118 is released from the abrupt projection on cam E and the combined action of springs 124 and 112 quickly and abruptly jerk the yoke and hood 92 and 96 back to the position shown in full lines of Fig. 7, whereupon the bottle may be tipped and the cap dropped from hood 96 to any suitable receptacle not here shown.

As the decapping operation, just described, is occurring, means for gripping the neck of the bottle is brought into play through the medium of cams A and B on driven shaft 54. An L-shaped rocker arm 130 having a series of pins 132 arranged in an arcuate path for engagement with the teeth of segmental gear 134 on stub shaft 136, is normally in the position shown in Fig. 1, where the horizontal arm thereof is in front of the bottle 20 about to be decapped. On this arm is pivotally mounted hook 140 having a pin 142 disposed a distance from pivotal connection 144 and extended into slot 146 of link 148.

Link 148 is, like hook 140, pivotally mounted intermediate its ends as at 150 to the underside of the horizontal portion of arm 130. While one end of link 148 is in engagement through the pin and slot structure with hook 140, the other end engages bar 152 (see Fig. 8), mounted on the vertical portion of rocker arm 130. This bar has a notch 154 at its upper end to receive roller 156 on link 148.

Bar 152 is pivotally mounted as at 158 intermediate its ends and a spring 160 yieldably maintains roller 162 thereof against cam face 164 of member 166 pivotally mounted on the same pivotal connection 138 as is arm 130. Pin 168 rides in slot 170 of member 166 as arm 130 and member 166 move relative to each other. Pin 168 is normally at the upper end of slot 170. Arm 172 of member 166 has a roller 174 thereon which rides over the properly developed face of cam B, as shown in Fig. 8.

When a bottle has been placed below the decapper and as cap 126 is being removed as previously described, the gripping parts just set forth, move into engagement with the bottle. Cam B forces arm 172 to the position shown in Fig. 8 to move the lower end of bar 152 to the left as viewed in Fig. 8, through the medium of member 166 and its cam face 164—so doing, shifts the upper end of bar 152 to the right, thereby swinging link 148 about its pivotal connection 150 to in turn swing hook 140 around the neck of the bottle. Spring 176 maintains roller 174 against the face of cam B through but a portion of its length, after which roller 174 leaves the face of cam B and spring 176 snaps member 166 back to a normal position against peg 178 carried by frame 22.

This movement of member 166 back to the normal position occurs while the bottle is being tilted to pour the contents thereof and to a position shown in dotted lines of Fig. 8.

Throughout the tilting action the bottle is gripped by hook 140. To tip the bottle, cam A comes into play. The periphery of cam A has a plurality of notches 180 formed therein and an abrupt arcuate, substantially radial surface 182 that is engaged by roller 184 on gear segment 134. When gear segment is turning about stub shaft 136, arm 130 will rotate about pivotal connection 138 and will be rocked to carry bottle 20 to the position shown in dotted lines of Fig. 8.

Obviously, the aforementioned parts for gripping the bottle will be carried therewith. Roller 186 rides over concentric surface 188 of cam A when arm 130 is in the normal vertical position, shown in Fig. 1. As soon as roller 184 strikes face 182, arm 130 moves down to a substantially horizontal position and thereafter due to the contour of face 190, arm 130 gradually tips to pour the contents of the bottle. When roller 184 leaves face 182 of cam A, the mouth of the bottle is just above the lip of the container 192, resting in the hereinafter described platform 194.

The downward travel of the mouth of bottle 20 is the same speed as that assumed by the hereinafter described platform 194—thus, the constant distance between bottle and cup is maintained until the bottle is inclined the fullest extent. At this point, roller 184 jumps into notches 180 in quick succession to reciprocate arm 130 about pivotal connection 138 to shake the bottle and thereby insure the complete dislodgment therefrom of any liquid that might remain on the lip of the bottle.

Stop 196 on frame 22 engages shoulder 198 of gear segment 134 to arrest the upward movement of rollers 184 and 186. Spring 200 yieldably maintains gear segment 134 against this stop and lies against the surface of cam A over which said rollers ride.

Just before bottle 20 is decapped a cup 192 is dropped from a magazine 202 thereof. This cup feeding mechanism is of conventional character and the operation thereof to drop one cup at a time is effected through rotating a vertical shaft 204 journalled in tubular standard 206 mounted on frame 22 and in turn supporting magazine 202 wherein cups 192 are placed in conventional fashion. A pin 208 extending radially from shaft 204 connects with the usual feeding lever and upon actuation of shaft 204 a cup is dropped from magazine 202 onto platform 194.

This step in the sequence of operations occurs through the medium of cam K contoured as shown in Fig. 3 and associated with lever 210 pivotally mounted as at 212 on frame 22. A roller 214 on one end of lever 210 rides over the periphery of cam K and is maintained thereagainst by spring 216. The upper end of lever 210 is pivotally joined to link 218 at its one end while the other end thereof is pivotally joined to arm 220 on shaft 204. Thus, at the time above specified, roller 214 leaves the arcuate portion of the periphery of cam K and rides along the straight section 222 of this cam to a point against shoulder 224 to move link 218 to the position shown in dotted lines of Fig. 3. As soon as roller 214 strikes shoulder 224, the parts operably connecting the cup feed are returned to their normal position.

A cup 192 is dropped onto the platform 194 as previously described when platform and guard ring 194 and 226 respectively, are in the full line positions shown in Figs. 3 and 13 to 15 inclusive.

Figure 4:
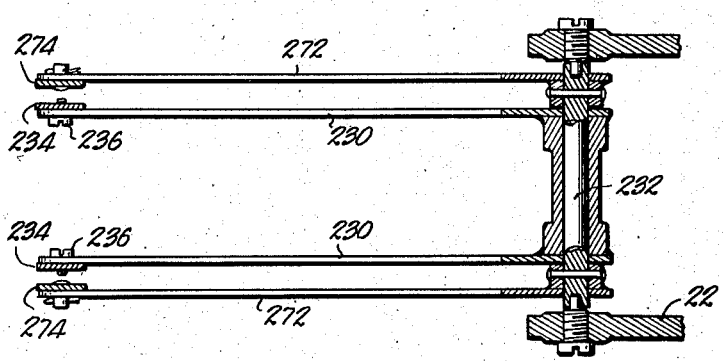
Fig. 4 is an enlarged detailed fragmentary sectional view taken on line IV—IV of Fig. 3.

Platform 194 is carried at the free ends of parallel arms 228 and 230. The inner ends of upper parallel arms 228 are pivotally mounted upon transverse shaft 122 for free movement about the axis thereof, while the inner ends of the lower parallel arms 230 are mounted for free rotation about the axis of another transverse shaft 232 journalled in frame 22, as shown in Fig. 4, for rotation about its axis. Platform 194 is secured to the bight of a U-shaped link 234 pivotally secured as at 236 to lower parallel arms 230 and as at 238 to upper parallel arms 228.

A transverse rod 240 extends through upper parallel arms 228 and a substantial distance therebeyond to project through slot 242 of rocker 244 and slot 246 of segment gear 248. Both rocker 244 and segment gear 248 are mounted on shaft 120 for movement thereabout.

Rocker 244 has a roller 250 on the inner end thereof bearing against cam I. This cam I has a radial face 252 that strikes roller 250 for the purpose of lifting platform 194 to its normal position. Rocker 244 accomplishes this movement by having its roller either forced downwardly to a position shown in Fig. 14 and there maintained until segmental gear 248 has its forward slotted end lowered through the action of cams H and G.

A toothed member 256 pivotally mounted on stub shaft 258 is in mesh with the teeth of segmental gear 248 and has substantially radial arms 260 and 262 projecting therefrom at substantially right angles. A roller 264 on the free end of arm 260 rides over the face of cam H to allow parallel arms 228 and 230 and platform 194 to drop gradually from the normal position as the open end of a bottle 220 is lowered during the tilting action.

A roller 266 on the side of arm 262 opposite from roller 264, rides close to the arcuate face of cam G to prevent upward movement—thus, as toothed member 256 oscillates about its pivotal support at 258, segmental gear 248 will oscillate about its mounting at 246. While these members 248 and 246 are serving to lower platform 194, roller 250 is out of engagement with the face of its associated cam I. The slow, gradual raising and lowering of platform 194 is to insure that the contents of a cup 192 will not be spilled. To insure that the cup will not be tipped or become dislodged, guard 226 is provided. The upper portion circumscribes the cup slightly above a midpoint and when platform 194 is near delivery opening 268, the guard is in the position shown in dotted lines of Fig. 13.

Parallel arms 270 and 272 have their outer ends in pivotal engagement with U-shaped element 274, the bight whereof forms the annulus that circumscribes the cup. The inner ends of parallel arms 270 and 272 are pinned to their respective shafts 120 and 232. Laterally projecting pin 276 on the parallel arm 270 adjacent cam J, passes through slot 278 in one end of lever 280 on the opposite end of which is mounted roller 282 that rides over the outermost arcuate face 284 of cam J. Lever 280 is loosely mounted on shaft 120. When roller 282 is riding over face 284 of cam J, lever 280 is holding parallel arms 270 and 272 in the position shown in dotted lines of Fig. 13.

Parallel arms 270 and 272 are carried down with parallel arms 228 and 230 by virtue of transverse rod 240 carried only by parallel arms 228 being forced against the upper edges of parallel arms 270 when platform 194 is lowered through the action of cams G and H, as above mentioned.

Figure 13:
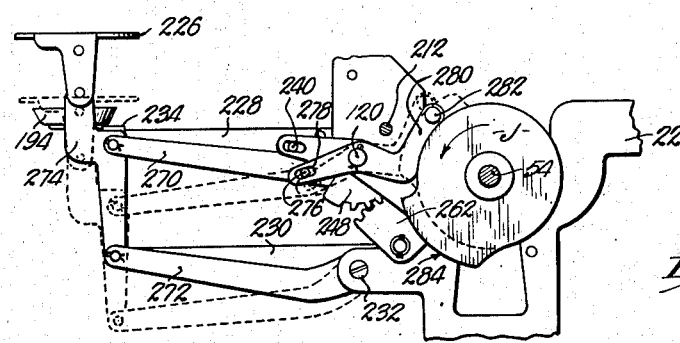
Fig. 13 is a fragmentary vertical sectional view taken on line XIII—XIII of Fig. 3, looking in the direction of the arrows.
Figure 14:
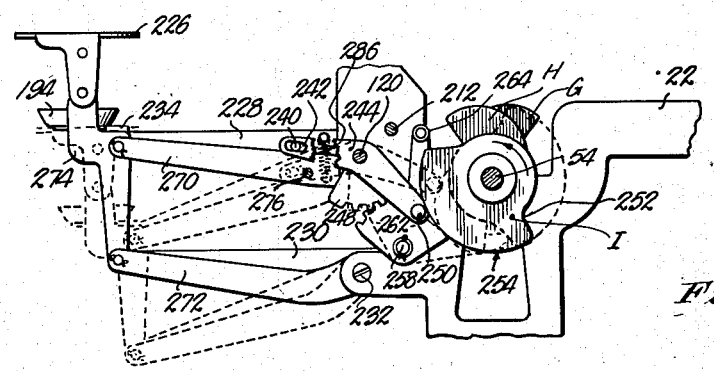
Fig. 14 is a similar view taken on line XIV—XIV of Fig. 3, looking in the direction of the arrows.
Figure 15:
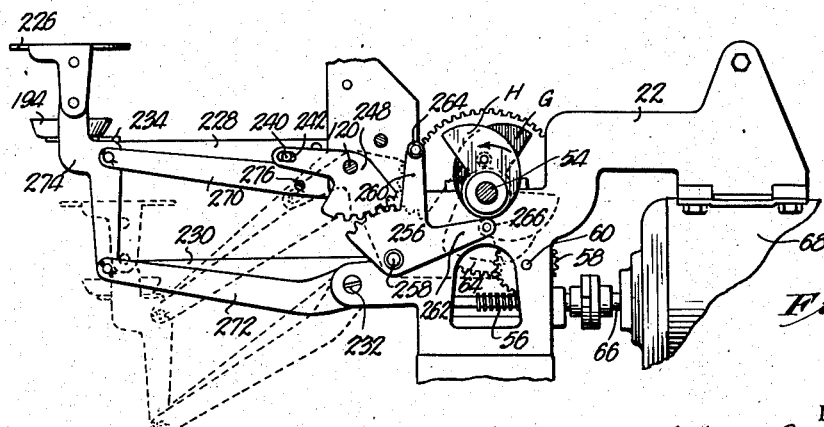
Fig. 15 is a similar view taken on line XV—XV of Fig. 5, looking in the direction of the arrows.

Platform 194 returns to its normal position just as roller 282 comes into contact with surface 284 of cam J and therefore, parallel arms 270 and 272 are held in the dotted line position shown in Fig. 13, when the machine is set and ready for starting its complete cycle.

Platform 194 is opposite the delivery opening 268 and guard 226 is near the lower end of the cup and no interference is offered to the operator when the cup is grasped.

Immediately after the machine is started by the dropping of a coin as will be hereinafter set down, roller 282 will drop from surface 284 to the full line position shown in Fig. 13, and the guard 226 will be ready for holding a cup after it has been dropped on platform 194 by the cup delivery mechanism. When roller 282 drops from surface 284, springs 286 extending between parallel arms 228 and 270 to the rear of rod 240, draws the top of parallel arms 270 against said rod 240 to limit the upward movement of guard 226.

From the foregoing it will be clear that when power is constantly applied to rotate driven shaft 54 all of the cams mounted thereon will revolve therewith and that the following steps in the sequence mentioned, will occur:

Guard 226 will raise above platform 194, a cup will immediately thereafter be fed as the gripping parts engage a bottle, decapping will occur as the bottle is gripped and the bottle will be tipped as cup platform 194 is lowered at a set distance from the mouth of the bottle. When the bottle reaches its greatest angle of inclination, it will be shaken to clear the same of any accumulated liquid and then will be returned to its upright position. When such is done, platform 194 will return to its normal position to lift the filled cup to a point adjacent to delivery opening 268 and guard 226 will move upwardly with platform 194 but will be arrested before the end of its upward path of travel is reached. Guard 226 will remain near the bottom of the cup so as not to interfere with delivery thereof. From this point on the cycle is repeated for the endless chain having holders 30 thereon will have been moved one step. At the initial movement, a full bottle will be positioned beneath the decapper. When the emptied bottle is returned to its upright position, it is passed to a point slightly to one side of the decapper hood.

It is desirable to have the apparatus start when a coin is dropped and since conventional electric circuits may be used, only a diagrammatical showing is made to indicate that such expedient is contemplated.

Coin chute 288 terminates near switch 290 which has the terminals thereof closed to complete a circuit as soon as coin 292 is deposited.

A switch, broadly designated by the numeral 294 and having an arm 296 yieldably maintained in place by a spring 298, is actuated by the movement of one of the parallel arms 230 through the medium of a finger 300 having a dog 302 pivotally mounted thereon and yieldably held in the position shown in Fig. 16.

When coin 292 is dropped, the circuit to coil 306 is closed through the following circuit:

From line 308 through wire 310, wire 312, wire 314, coil 306, wire 316 to line 318. As soon as coil 306 is energized, it closes switch points 320 and 322 and current is supplied to motor 68 through the following circuit:

Wire 324, closed switch points 320 and 322, wire 326, motor 68, wire 328 to line 318.

As the operation of the machine progresses, parallel arm 230 is lowered and dog 302 is depressed by arm 296. Dog 302 lifts arm 296 on the upward movement of arm 230 to open switch 294 which has heretofore been supplying current to coil 306 through a circuit as follows:

Line 308, wire 330, closed switch points 332 and 334, wire 336, closed switch 294, wire 338, wire 314, coil 306 and wire 316 to line 318.

Thus, after a coin has been deposited, the machine will automatically continue through all of the aforesaid steps until arm 230 travels upwardly in its final movement to deliver cup 192. When such is done, switch 294 is opened and the supply of current to motor 68 is interrupted.

The operation of the apparatus has been made clear during the foregoing specification and while many parts of the mechanism are well-known in the art have been specifically described, such has been done to render clear the novel combination and unique arrangement of elements embodying the broad concepts of the invention. It is realized that changes and modifications might be made without departing from the spirit of the invention or scope of the appended claims.

Having thus described the invention, what is claimed as new and desired to be secured by Letters Patent is:

1. Apparatus of the character described and for opening and emptying bottles, comprising a carrier for a plurality of substantially upright, vertically arranged capped bottles; a decapper disposed above the bottles; means for successively locating the capped bottles below the decapper; apparatus for operating the decapper to remove the cap from the bottles as the same are located therebelow; structure for tipping the decapped bottle to empty the contents thereof subsequent to decapping means for interrupting travel of the carrier while a decapped bottle is in tipped condition; and parts adapted to grip the decapped bottle near the mouth thereof to prevent dropping as the same is tipped to a downwardly inclined position said parts for gripping the bottle being adapted to shake the bottle after it has been tipped downwardly for a predetermined length of time and while the movement of the carrier is interrupted.

2. Apparatus of the character described and for opening and emptying bottles, comprising a carrier for a plurality of substantially upright, vertically arranged capped bottles; a decapper disposed above the bottles; means for successively locating the capped bottles below the decapper; apparatus for operating the decapper to remove the cap from the bottles as the same are located therebelow; structure for tipping the decapped bottle to empty the contents thereof subsequent